(12) United States Patent
Driver

(10) Patent No.: US 8,303,882 B2
(45) Date of Patent: Nov. 6, 2012

(54) APPARATUS AND METHOD OF MAKING COMPOSITE MATERIAL ARTICLES

(75) Inventor: Howard Daniel Driver, Greer, SC (US)

(73) Assignee: General Electric Company, Schenectady, NY (US)

(*) Notice: Subject to any disclaimer, the term of this patent is extended or adjusted under 35 U.S.C. 154(b) by 508 days.

(21) Appl. No.: 12/390,806

(22) Filed: Feb. 23, 2009

(65) Prior Publication Data
US 2010/0213644 A1   Aug. 26, 2010

(51) Int. Cl.
*B29C 43/12* (2006.01)
(52) U.S. Cl. ........ 264/314; 264/553; 264/101; 264/102; 425/522
(58) Field of Classification Search .......... 264/313–314, 264/316, 101–102; 425/522
See application file for complete search history.

(56) References Cited

U.S. PATENT DOCUMENTS

| | | | |
|---|---|---|---|
| 5,366,684 A * | 11/1994 | Corneau, Jr. ................. | 264/510 |
| 5,643,522 A | 7/1997 | Park | |
| 5,707,723 A * | 1/1998 | Harrison et al. ........... | 428/313.3 |
| 6,231,796 B1 | 5/2001 | Allen | |
| 6,299,810 B1 | 10/2001 | Blackinton, Jr. | |
| 6,318,433 B1 | 11/2001 | Reis et al. | |
| 7,186,367 B2 | 3/2007 | Hou et al. | |
| 7,351,040 B2 | 4/2008 | Livingston et al. | |
| 7,413,694 B2 | 8/2008 | Waldrop, III et al. | |
| 7,438,533 B2 | 10/2008 | Eyb et al. | |
| 2007/0107220 A1 | 5/2007 | Bakhuis et al. | |
| 2007/0251090 A1 | 11/2007 | Breugel et al. | |

* cited by examiner

*Primary Examiner* — Christina Johnson
*Assistant Examiner* — Xue Liu
(74) *Attorney, Agent, or Firm* — James McGinness, Esq.; Armstrong Teasdale LLP

(57) ABSTRACT

A method of making a composite material article includes, in an exemplary embodiment, providing a pre-impregnated preform formed from a plurality of reinforcing fibers and a polymer matrix, positioning the preform on a flat base plate, positioning a pressure bladder on top of the preform, and positioning a bridge tool above the pressure bladder. The bridge tool includes a top plate and at least one support member. The support members are coupled to the base plate with the top plate spaced above the pressure bladder. The method also includes enclosing the preform and bridge tool inside a vacuum bag by sealingly attaching the vacuum bag to the base plate, drawing a vacuum in the vacuum bag to remove air and volatiles from the preform, and then applying pressure to the preform by inflating the pressure bladder to consolidate the preform.

20 Claims, 6 Drawing Sheets

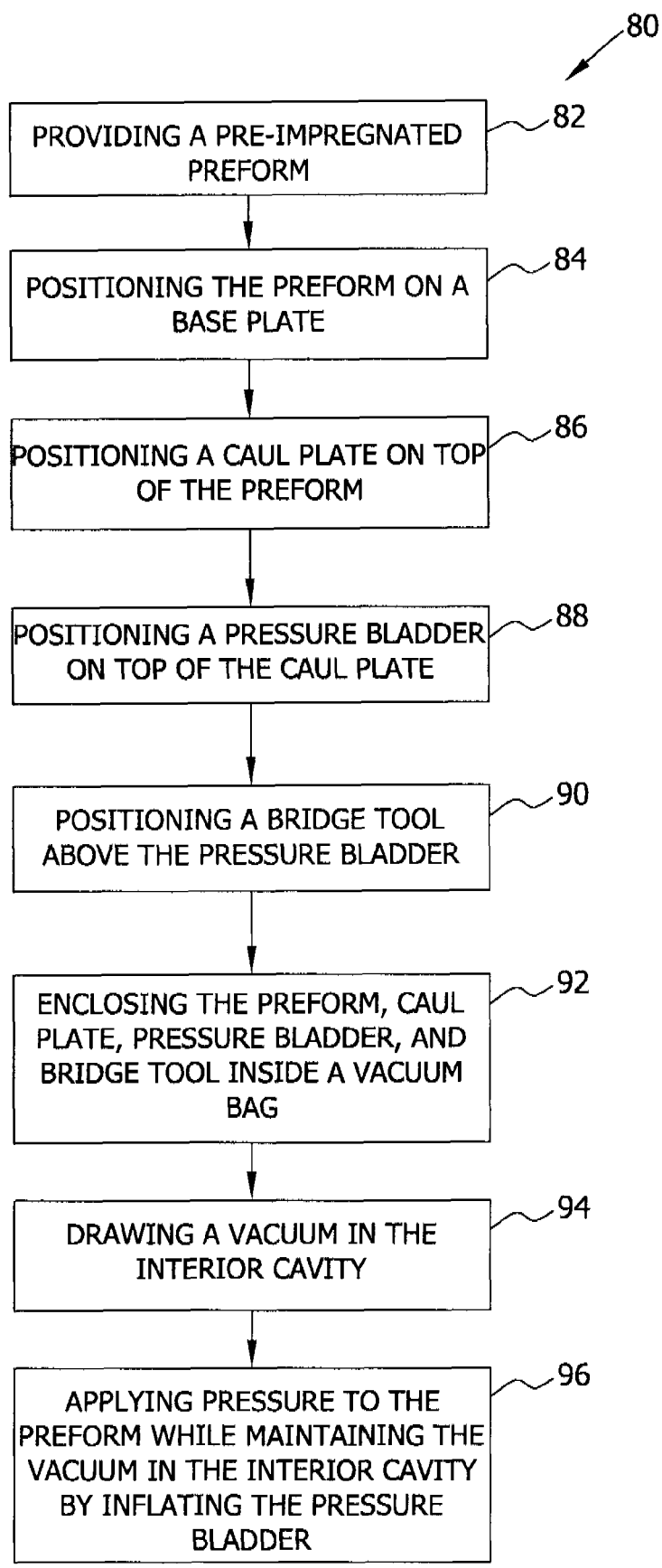

APPARATUS AND METHOD OF MAKING COMPOSITE MATERIAL ARTICLES

BACKGROUND OF THE INVENTION

The field of the invention relates generally to processing composite materials, and more particularly to processing composite materials utilizing a vacuum bag and an air bladder.

Composite materials are increasingly being used for the manufacture of a variety of products because of their high strength and durability along with the ability to be formed into a variety of shapes. A longstanding problem for the processing of composite materials is that they are most commonly processed using a vacuum bag. Decades ago this was thought to be an ideal solution because one process (vacuum) would provide two desired effects on the laminated preform, to pull air and volatiles from the laminate while also providing ambient pressure to consolidate the laminate. Augmentation of pressure by autoclave is used routinely for smaller components but is not practical for large parts, for example, boat hulls and wind turbine blades. Resin systems have been developed that enable the curing of pre-impregnated materials without the use of autoclaves specifically to solve the large part problem (boats and wind turbine blades). A single vacuum bag is typically used for curing these systems; however, the resulting void content in the composite is usually too high which can negatively effect strength and other properties of the composite. The single vacuum bag technique is not considered the most ideal way to make very low void content composite components without the use of an autoclave. The pressure that is applied to the preform inside the vacuum bag actually hinders the removal of bubbles by trapping the bubbles containing air and/or volatiles between the tacky layers of fiber and resin.

One known way to overcome this problem is to use multiple vacuum bags to obviate the need for a large expensive vacuum chamber. U.S. Pat. No. 7,413,694 B2 describes a vacuum bag within a vacuum bag to form an inner and outer chamber. The respective pressures in the inner and outer chambers are regulated to facilitate resin infusion into a dry fibrous preform. The level of independence achievable by this method is limited and not sufficient for pre-impregnated forms of composites. Another patent, U.S. Pat. No. 7,186,367, also describes a double vacuum bag approach. In this approach, the outer bag is constrained by an added rigid component, positioned between the inner and outer vacuum bags, from applying any pressure to the preform while the preform is under a vacuum.

BRIEF DESCRIPTION OF THE INVENTION

In one aspect, a method of making a composite material article is provided. The method includes providing a pre-impregnated preform formed from a plurality of reinforcing fibers and a polymer matrix, positioning the preform on a base plate, positioning a pressure bladder on top of the preform, and positioning a bridge tool above the pressure bladder. The bridge tool includes a top plate and at least one support member. The support members are coupled to the base plate with the top plate spaced above the pressure bladder. The method also includes enclosing the preform and bridge tool inside a vacuum bag, drawing a vacuum in the vacuum bag to remove air and volatiles from the preform, and applying pressure to the preform by inflating the pressure bladder to consolidate the preform.

In another aspect, an apparatus for processing a pre-impregnated preform that is formed from a plurality of fibers and a polymer matrix is provided. The apparatus includes a base plate having a top surface and a bottom surface, and a bridge tool coupled to the base plate. The bridge tool includes a top plate and at least one support member extending from the top plate. The support members are coupled to the top surface of the base plate. The apparatus also includes a pressure bladder positioned below the top plate of the bridge tool. The pressure bladder is sized to be positioned on a preform that has been positioned on the top surface of the base plate. The apparatus further includes a vacuum bag sealingly attached to the base plate forming a chamber. The bridge tool and pressure bladder are positioned inside the chamber.

In another aspect, a method of making a composite material article is provided. The method includes providing a pre-impregnated preform formed from a plurality of reinforcing fibers and a polymer matrix, and positioning the preform inside a processing apparatus. The processing apparatus includes a base plate having a top surface and a bottom surface, and a bridge tool coupled to the base plate. The bridge tool having a top plate and at least one support member extending from the top plate and coupled to the top surface of the base plate. The processing apparatus also includes a pressure bladder positioned below the top plate of the bridge tool and on top of the preform, and a vacuum bag. The bridge tool and pressure bladder are positioned inside the vacuum bag. The method also includes drawing a vacuum in the vacuum bag to remove air and volatiles from the preform, and then applying pressure to the preform by inflating the pressure bladder to consolidate the preform.

BRIEF DESCRIPTION OF THE DRAWINGS

FIG. 6 is a flow chart of a method of making a composite material article.

DETAILED DESCRIPTION OF THE INVENTION

An apparatus and method of making composite material articles is described below in detail. The apparatus and method is described in reference to a wind turbine blade, but can be applicable to any composite article. The method utilizes an outer vacuum bag with a hard bridge tool to provide a vacuum cavity, and a pressure bladder constrained by the bridge tool to manage the independent control of pressure and vacuum. In addition the method provides for pressures higher than the pressure provided by known vacuum bag processes, which is limited to about 15 pounds per square inch (psi). Utilizing a pressure bladder permits operation in the range of known vacuum bag processes of greater than about 0 psi to about 15 psi, but also permits operation in a higher range of about 15 psi to about 200 psi. An advantage of higher processing pressure is that a higher pressure will result in faster and more complete consolidation of the preform. The pre-impregnated preform materials are typically B-staged (partially cured) into a state of very high viscosity and very low flow of the polymer matrix of the preform. With a known vacuum pressure only process, there is a finite hold time to wait for the polymer matrix to flow. A higher pressure provided by the pressure bladder facilitates shortening the hold time of the preform.

Although heat can be used to quicken the flow, heat will also advance the cure of the polymer matrix, which is not desired at this point in the fabricating process. The goal is to fully consolidate the preform without advancing the cure. The consolidated preform is then moved to a shaped mold for final shaping and curing inside a vacuum bag. This molding step is where trapped air and gas is typically removed from the wind turbine blade being formed, but not very effectively. Utilizing the apparatus and method of processing the preform, described more completely below, provides for complete removal of voids prior to molding and curing to the final blade geometry. This drastically reduces the time required in the expensive mold of final geometry. Therefore, process cycle time is improved and fabricating capacity is increased.

Figure 1:
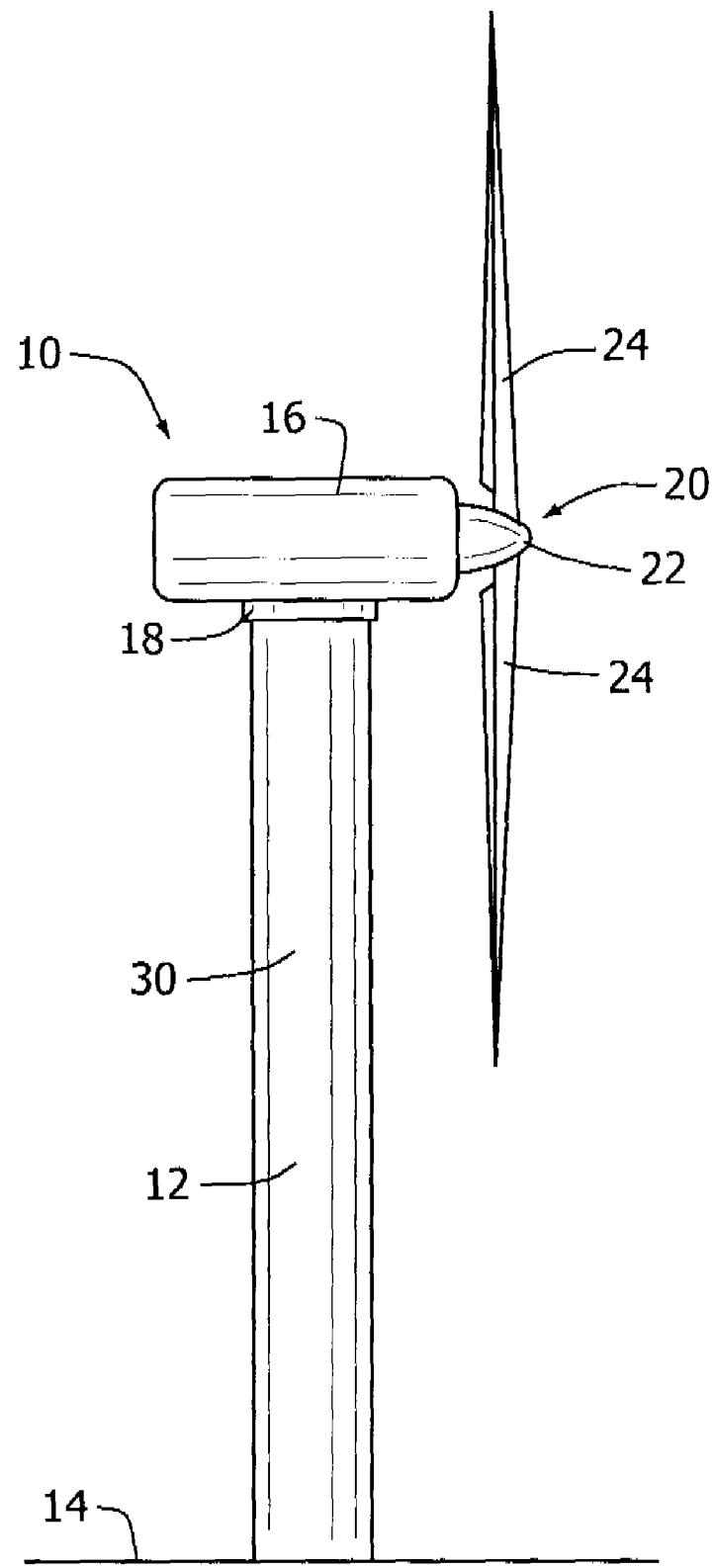
FIG. 1 is a side elevation schematic illustration of an exemplary configuration of a wind turbine.

Referring to the drawings, FIG. 1 is a side elevation schematic illustration of a wind turbine 10, such as, for example, a horizontal axis wind turbine. Wind turbine 10 includes a tower 12 extending from a supporting surface 14, a nacelle 16 mounted on a bedframe 18 of tower 12, and a rotor 20 coupled to nacelle 16. Rotor 20 includes a hub 22 and a plurality of rotor blades 24 coupled to hub 22. In the exemplary embodiment, rotor 20 includes three rotor blades 24. In an alternative embodiment, rotor 20 includes more or less than three rotor blades 24. In the exemplary embodiment, tower 12 is fabricated from tubular steel and includes a cavity 30 extending between supporting surface 14 and nacelle 16. In an alternate embodiment, tower 12 is a lattice tower.

Various components of wind turbine 10, in the exemplary embodiment, are housed in nacelle 16 on top tower 12 of wind turbine 10. The height of tower 12 is selected based upon factors and conditions known in the art. In some configurations, one or more microcontrollers in a control system are used for overall system monitoring and control including pitch and speed regulation, high-speed shaft and yaw brake application, yaw and pump motor application and fault monitoring. Alternative distributed or centralized control architectures are used in alternate embodiments of wind turbine 10. In the exemplary embodiment, the pitches of blades 24 are controlled individually. Hub 22 and blades 24 together form wind turbine rotor 20. Rotation of rotor 20 causes a generator to produce electrical power.

In use, blades 24 are positioned about rotor hub 22 to facilitate rotating rotor 20 to transfer kinetic energy from the wind into usable mechanical energy. As the wind strikes blades 24, and as blades 24 are rotated and subjected to centrifugal forces, blades 24 are subjected to various bending moments. As such, blades 24 deflect and/or rotate from a neutral, or non-deflected, position to a deflected position. Moreover, a pitch angle of blades 24 can be changed by a pitching mechanism to facilitate increasing or decreasing blade 24 speed, and to facilitate reducing tower 12 strike.

Figure 2:
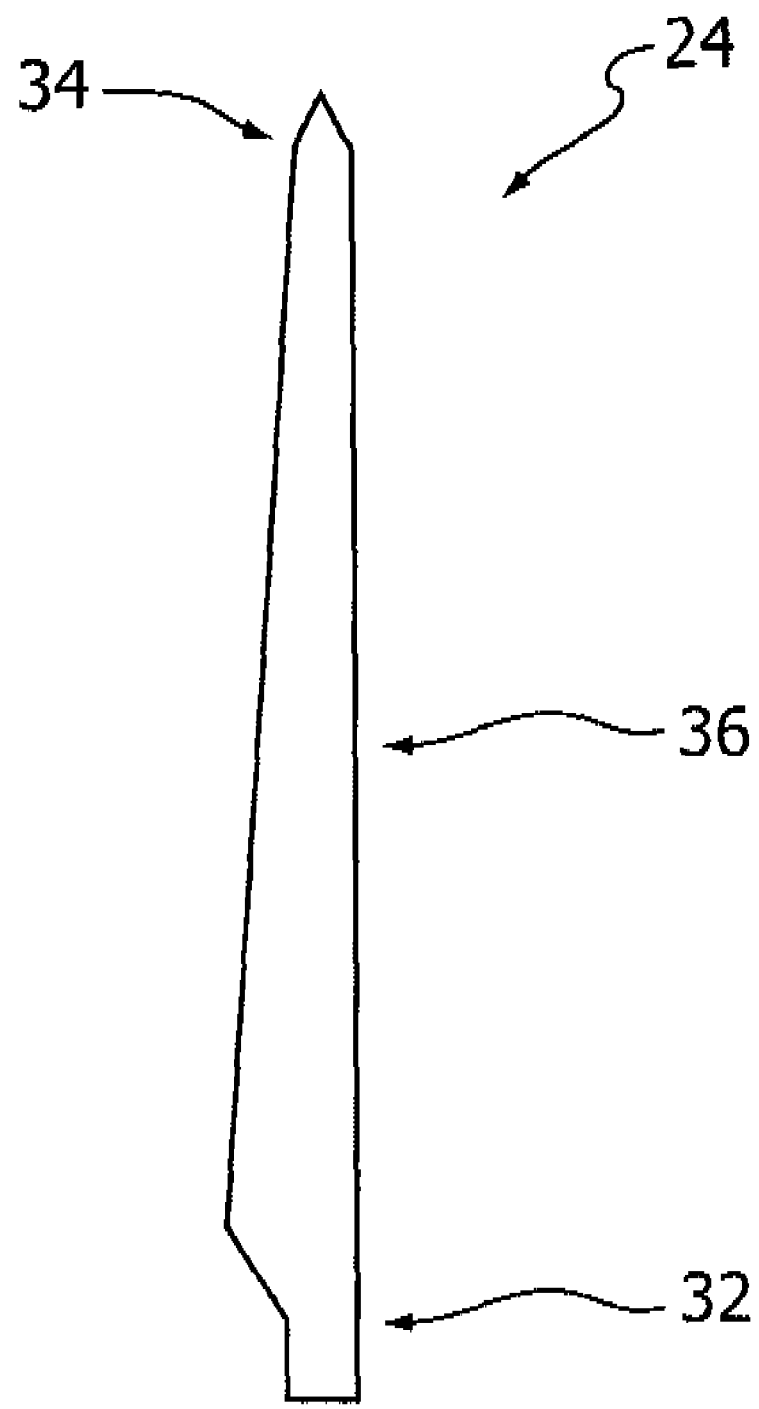
FIG. 2 is a front view of a wind turbine rotor blade.

The basic configuration of a rotor blade 24 is shown in FIG. 2. Therein, rotor blade 24 includes a root section 32 used to mount rotor blade 24 to hub 22. Opposite to root section 32, a tip end 34 of rotor blade 24 is disposed. A body section 36 of rotor blade 24 extends between root section 32 and tip end 34.

Figure 3:
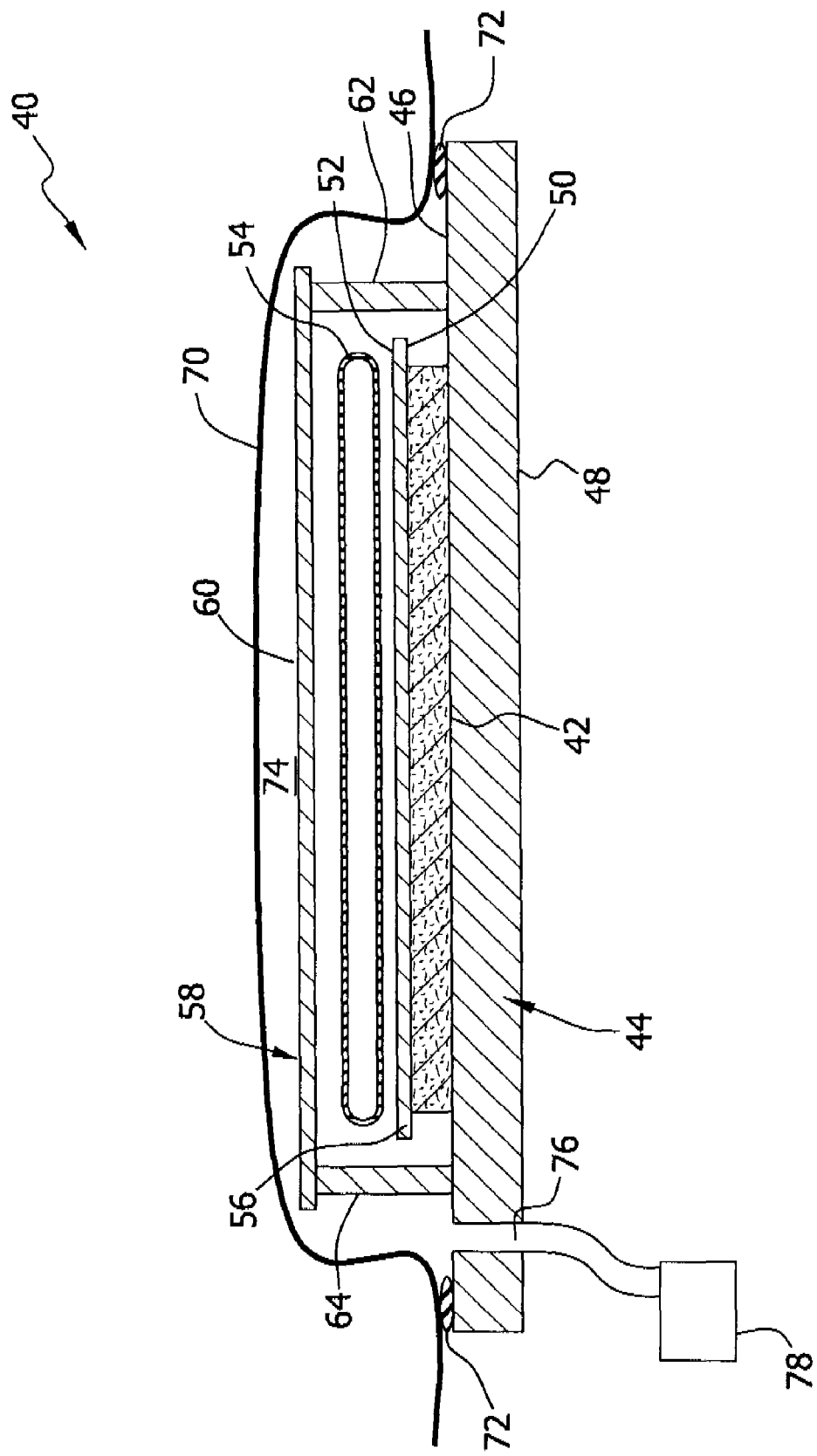
FIG. 3 is a sectional illustration of an apparatus for processing a pre-impregnated preform in accordance with one embodiment.

FIG. 3 is a sectional illustration of an exemplary embodiment of a processing apparatus 40 that may be used to remove air and volatiles from a pre-impregnated preform 42 to eliminate voids from preform 42. Processing apparatus 40 also consolidates the preform to form a fully consolidated article that is ready for subsequent molding and curing. Processing apparatus 40 includes a base plate 44 having a top surface 46 and a bottom surface 48. Base plate 44 may also be referred to as a tool plate. Preform 42 is positioned on top surface 46 of base plate 44 for processing. A caul plate 50 is positioned on a top surface 52 of preform 42. A pressure bladder 54 is positioned on a top surface 56 of caul plate 50. Pressure bladder 54 is used to apply pressure to preform 42 through caul plate 50 to consolidate preform 42. In another embodiment, caul plate 50 is not used, and pressure bladder 54 applies pressure directly to preform 42.

Figure 4:
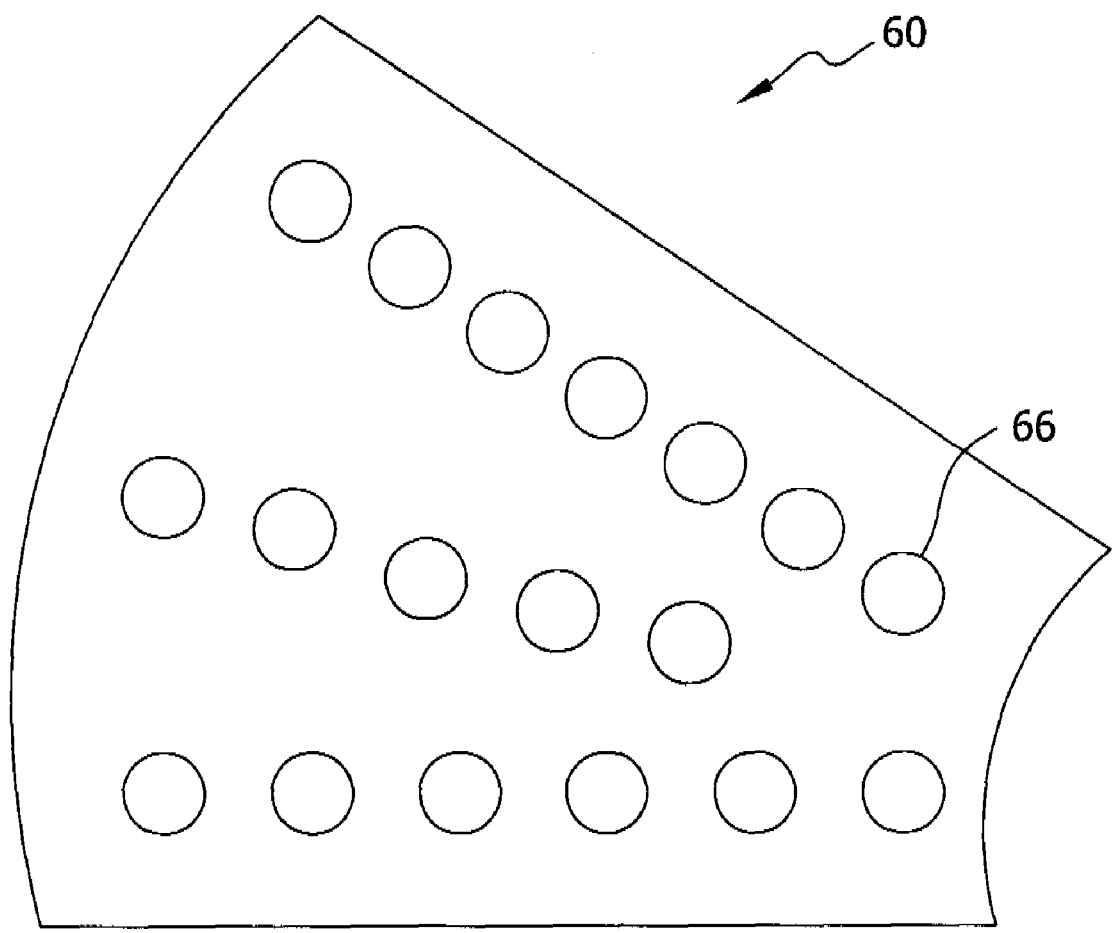
FIG. 4 is a top view of the top plate of the bridge tool shown in FIG. 1.
Figure 5:
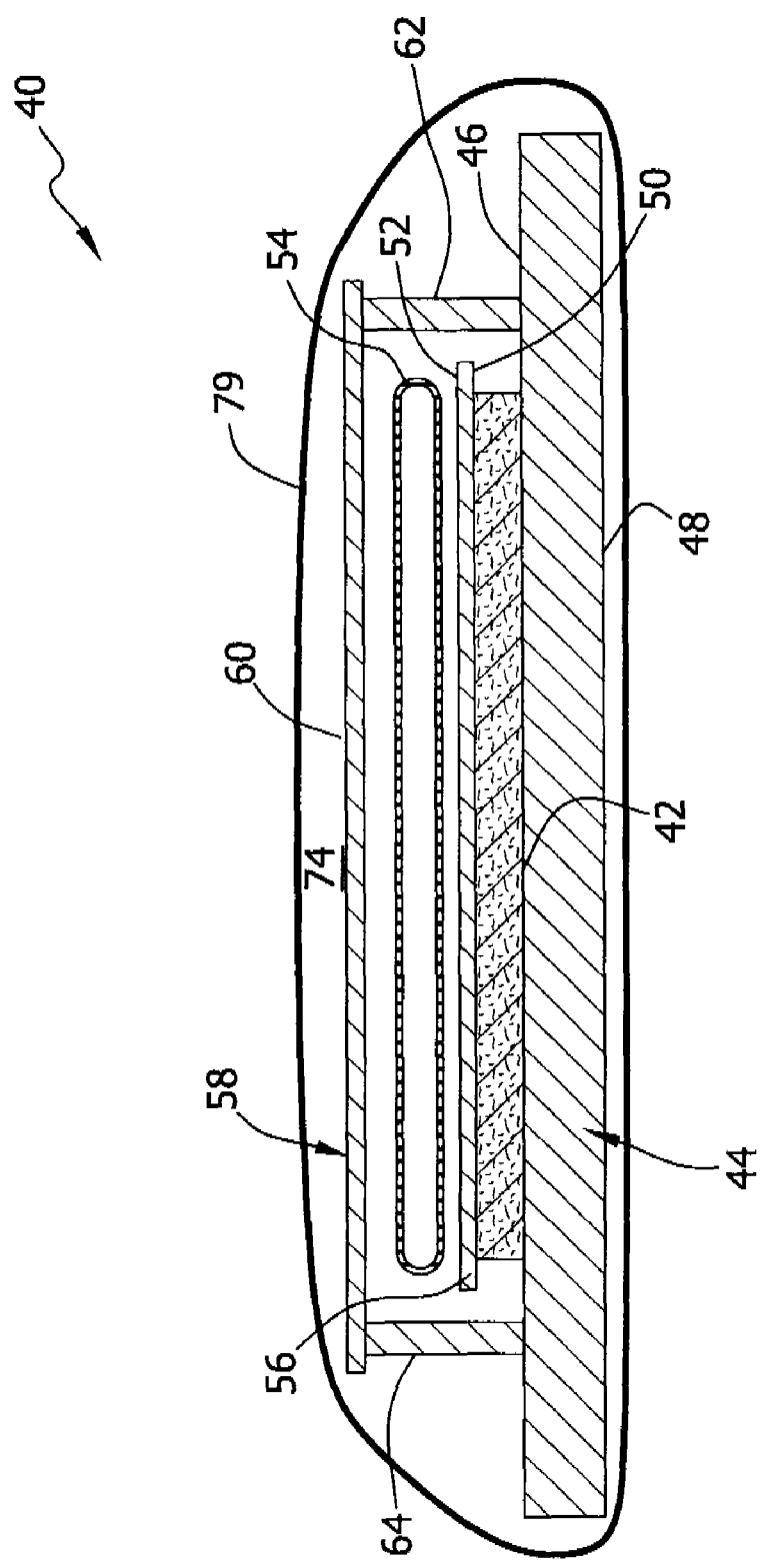
FIG. 5 is a sectional illustration of an apparatus for processing a pre-impregnated preform in accordance with another embodiment.

A bridge tool 58 is attached to base plate 44 surrounding preform 42, caul plate 50, and pressure bladder 54. Referring also to FIG. 4, bridge tool 58 includes a top plate 60 and opposing support members 62 and 64. Support members 62 and 64 are attached to base plate 44 and are sized so that top plate 60 is spaced above pressure bladder 54. A plurality of openings 66 extend through top plate 60 to permit air to pass through top plate 60. A vacuum bag 70 encloses bridge tool 58, preform 42, caul plate 50 (when used), and pressure bladder 54. Vacuum bag 70 is attached to base plate 44 with a seal 72 forming an interior cavity 74. A vacuum port 76 extends through base plate 44 to communicatably connect interior cavity 74 with a vacuum pump 78. In another embodiment, vacuum port 76 extends through vacuum bag 70. Vacuum bag 70 may include other materials or structures, for example, a layer of porous material to conduct the vacuum throughout interior cavity 74. In another embodiment, vacuum bag 70 is a flexible outer vacuum bladder 79, shown in FIG. 5. Base plate 44, bridge tool 58, preform 42, caul plate 50 (when used), and pressure bladder 54 positioned inside vacuum bladder 79. Vacuum bladder 79 may be formed from any suitable material, for example rubber.

Preform 42 is formed from a plurality of reinforcing fibers and a polymer matrix by impregnating a web/mat of reinforcing fibers with a polymer. Any suitable reinforcing fiber can be used in preform 42. Examples of suitable reinforcing fibers include, but are not limited to, glass fibers, graphite fibers, carbon fibers, polymeric fibers, ceramic fibers, aramid fibers, kenaf fibers, jute fibers, flax fibers, hemp fibers, cellulosic fibers, sisal fibers, coir fibers and mixtures thereof. Any suitable polymer can be used to form preform 42, including thermosetting polymers and thermoplastic polymers. Examples of suitable thermosetting polymers include, but are not limited to, vinyl ester polymers, epoxy polymers, polyester polymers, polyurethane polymers, and mixtures thereof. Examples of thermoplastic polymers include, but are not limited to, polyolefins, polyamides, polyesters, polysulfones, polyethers, acrylics including methacrylic polymers, polystyrenes, polypropylenes, polyethylenes, polyphenelene sulfones, and mixtures thereof.

Base plate 44, caul plate 50, and bridge tool 58 can be made from any suitable material, for example, any suitable metal, such as steel. In other embodiments, any one of base plate 44, caul plate 50, and bridge tool 58 can be formed from other materials, for example, plastic materials, including fiber reinforced fibers. In the exemplary embodiment, base plate 44 is flat; however, in another embodiment, base plate 44 can have any suitable shape to produce a three dimensional preform 42. In a further embodiment, caul plate 50 may be flexible to facilitate forming shaped articles other than flat shaped preforms. A flexible caul plate 50 may be formed from a flexible plastic or rubber material, with or without fiber reinforcement.

FIG. 6 is a flow chart of a method 80 of making a composite material article, for example, rotor blade 24, shown in FIG. 2.

Method 80 includes providing 82 a pre-impregnated preform formed from a plurality of reinforcing fibers and a polymer matrix, positioning 84 the preform on a base plate, positioning 86 a caul plate on top of the preform, and positioning 88 a pressure bladder on top of the caul plate. Method 80 also includes positioning 90 a bridge tool above the pressure bladder with bridge tool support members attached to the base plate, and enclosing 92 the preform, caul plate, pressure bladder, and bridge tool inside vacuum bag 70. Further, method 80 includes drawing 94 a vacuum in the vacuum bag through a vacuum port to remove air and volatiles from the preform. Top plate 60 of bridge tool 58 prevents vacuum bag 70 from contacting caul plate 50 and prevents any pressure being applied to preform 42. Pressure applied to preform 42 can impede the removal of air and volatiles from preform 42. Then method 80 includes applying 96 pressure to th preform after the vacuum has been established in the vacuum bag, and while maintaining the vacuum. Pressure is applied to preform 42 by inflating pressure bladder 54 with air causing pressure bladder 54 to expand. Top plate 60 of bridge tool 58 constrains upward expansion of pressure bladder 54 causing pressure bladder to impart pressure to caul plate 50 and preform 42 to consolidate preform 42. The resultant flat consolidated preform is then moved to a shaped mold for final shaping and curing to form rotor blade 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of making a composite material article, said method comprising:
   providing a pre-impregnated preform comprising a plurality of reinforcing fibers and a polymer matrix;
   positioning the preform on a base plate;
   positioning a pressure bladder on top of the preform;
   positioning a bridge tool above the pressure bladder, the bridge tool comprising a top plate and at least one support member, the at least one support member coupled to the base plate and the top plate spaced above the pressure bladder;
   enclosing the preform, pressure bladder, and bridge tool inside a vacuum bag;
   drawing a vacuum in the vacuum bag to remove air and volatiles from the preform; and
   applying pressure to the preform by inflating the pressure bladder.

2. A method in accordance with claim 1 further comprising positioning a caul plate between the preform and the pressure bladder.

3. A method in accordance with claim 1 wherein enclosing the preform, pressure bladder, and bridge tool inside a vacuum bag comprises enclosing the preform, pressure bladder, and bridge tool inside the vacuum bag by sealingly attaching the vacuum bag to the base plate.

4. A method in accordance with claim 1 wherein applying pressure to the preform comprises applying a pressure of greater than about 0 psi to about 200 psi to the preform.

5. A method in accordance with claim 1 wherein applying pressure to the preform comprises applying a pressure of between about 15 psi to about 200 psi to the preform.

6. A method in accordance with claim 1 wherein the top plate of the bridge tool comprises a plurality of air holes extending therethrough.

7. A method in accordance with claim 1 wherein the vacuum bag comprises a flexible vacuum bladder, the base plate, preform, and bridge tool positioned inside the vacuum bladder.

8. A method in accordance with claim 1 wherein the preform comprises a plurality of fibers selected from the group consisting of glass fibers, graphite fibers, carbon fibers, ceramic fibers aramid fibers, kenaf fibers, jute fibers, flax fibers, hemp fibers, cellulosic fibers, sisal fibers, coir fibers, and mixtures thereof.

9. An apparatus for processing a pre-impregnated preform, the preform comprising a plurality of fibers and a polymer matrix, said apparatus comprising:
   a base plate having a top surface and a bottom surface;
   a bridge tool coupled to said base plate, said bridge tool comprising a top plate and at least one support member extending from said top plate, said at least one support member coupled to said top surface of said base plate;
   a pressure bladder positioned below said top plate of said bridge tool, said pressure bladder sized to be positioned on the preform positioned on said top surface of said base plate; and
   a vacuum bag, said pressure bladder and said bridge tool positioned inside said vacuum bag.

10. An apparatus in accordance with claim 9 further comprising a caul plate positioned below said pressure bladder, said caul plate sized to be positioned between the pressure bladder and the preform positioned on said top surface of said base plate.

11. An apparatus in accordance with claim 9 wherein said vacuum bag is sealingly attached to said base plate forming a chamber, said pressure bladder and said bridge tool positioned inside said chamber.

12. An apparatus in accordance with claim 9 wherein said top plate of said bridge tool comprises a plurality of air holes extending therethrough.

13. An apparatus in accordance with claim 9 wherein said vacuum bag comprises flexible vacuum bladder, said base plate, and said bridge tool positioned inside said vacuum bladder.

14. A method of making a composite material article, said method comprising:
   providing a pre-impregnated preform comprising a plurality of reinforcing fibers impregnated with a polymer matrix;
   positioning the preform inside a processing apparatus, the processing apparatus comprising:
      a base plate having a top surface and a bottom surface;
      a bridge tool coupled to the base plate, the bridge tool comprising a top plate and at least one support member extending from the top plate, the at least one support member coupled to the top surface of the base plate;
      a pressure bladder positioned below the top plate of the bridge tool; and
      a vacuum bag, the bridge tool and the pressure bladder positioned inside the vacuum bag;

drawing a vacuum in the vacuum bag to remove air and volatiles from the preform; and applying pressure to the preform by inflating the pressure bladder.

15. A method in accordance with claim 14 further comprising positioning a caul plate between the preform and the pressure bladder.

16. A method in accordance with claim 14 wherein the vacuum bag is sealingly attached to the base plate forming a chamber, the bridge tool and the pressure bladder positioned inside the vacuum bag.

17. A method in accordance with claim 14 wherein applying pressure to the preform comprises applying a pressure of greater than about 0 psi to about 200 psi to the preform.

18. A method in accordance with claim 14 wherein applying pressure to the preform comprises applying a pressure of between about 15 psi to about 200 psi to the preform.

19. A method in accordance with claim 14 wherein the top plate of the bridge tool comprises a plurality of air holes extending therethrough.

20. A method in accordance with claim 19 wherein the vacuum bag comprises an outer vacuum bladder, the base plate, preform, and bridge tool positioned inside the vacuum bladder.

* * * * *